UNITED STATES PATENT OFFICE.

JOHN D. MORRON, OF LAKEWOOD, OHIO, ASSIGNOR TO THE MECHANICAL RUBBER COMPANY, A CORPORATION OF NEW JERSEY.

METHOD OF RECOVERING RUBBER SOLVENT.

1,312,452.  Specification of Letters Patent.  Patented Aug. 5, 1919.

No Drawing.  Application filed April 14, 1916.  Serial No. 91,120.

*To all whom it may concern:*

Be it known that I, JOHN D. MORRON, a citizen of the United States, residing at Lakewood, county of Cuyahoga, State of Ohio, have invented certain new and useful Improvements in Methods of Recovering Rubber Solvent, of which the following is a full, clear, and exact description.

This invention relates to the manufacture of vulcanized plastic articles by the dipping process.

An object of this invention is to remove the solvent from the solution of the plastic after the successive dips, without substantial loss thereof.

Another object of this invention is to remove the solvent from the plastic material between the successive dips much more quickly than is possible by the methods now commonly in use.

In the following specification I shall confine myself to a description of the application of my invention to the manufacture of rubber articles by the dipping method, and it is in connection with rubber that it is principally used, but it should be understood that this method is equally applicable to the manufacture by the dipping process of articles from other analogous materials such as balata and gutta percha.

The dipping method of manufacturing rubber articles consists in submerging forms of the desired shape in a solution of rubber or other similar material, a sufficient number of times to allow the desired thickness of rubber to accumulate on the forms, and then vulcanizing the same to retain its permanent shape. To produce satisfactory results it is necessary that after each dip the solvent in the solution be removed from the coating received by the form. Heretofore, the common method of accomplishing this removal of the solvent, has been to merely allow the solvent to evaporate into the atmosphere; at best, a comparatively slow process. Another serious objection to drying by atmospheric evaporation is the attendant danger of fire, the rubber solvents most ordinarily utilized being benzin, benzol or gasolene, each of which when mixed with air forms a highly explosive gas.

My method consists in subjecting the dipped forms, immediately they are removed from the rubber solution, to a liquid bath in which the rubber or rubber compound is not soluble, but which is mutually soluble with the rubber solvent. In this way, the solvent passes into solution with the bath and leaves a firm compact film of rubber on the form free from porosity or blisters. Having removed the solvent from the rubber on the forms by means of the bath, steps are taken to recover the solvent from the bath.

In carrying out my method using a benzol-rubber solution, the forms are dipped in the usual way. After removing from the solution they are ordinarily inverted for a short period to permit the accumulated layer to distribute itself evenly thereon, after which I submerge them in the solvent-extracting bath, for instance, denatured alcohol. In a few minutes the benzol passes into solution with the alcohol and leaves a firm film of rubber on the forms. I have found that to produce satisfactory results it is advisable to provide a fresh extracting bath when that being used has taken on as much as 25% of the rubber solvent.

After the forms are removed from the extracting bath, as soon as the small amount of alcohol clinging to the rubber surfaces has evaporated, the dipping can be repeated.

In the recovery of the rubber solvent from the extracting bath, the latter is thoroughly agitated with a considerable quantity of mineral oil, for instance, pale paraffin oil (sp. gr. 0.89) in proportion six parts oil to one part benzol, by volume. The resulting mixture is allowed to settle and separate, the benzol being taken up by mineral oil. The oil and benzol can then be drawn off from the alcohol, which is left substantially pure. The benzol is recovered from the oil by distillation. If any traces of alcohol remain in the benzol, calcium chlorid is added thereto, forming with the alcohol a solid precipitate which may be filtered off.

Having thus described my invention, what I claim and desire to protect by Letters Patent is:

1. In the recover of rubber solvent in the manufacture of vulcanized rubber articles by the dipping method, first passing the dipping form coated with the rubber solution through a bath which is mutually soluble with the rubber solvent but not with the rubber; and secondly recovering said solvent from the bath by agitating the latter with oil, permitting the mixture to settle and separate, the solvent being taken up by the oil.

2. In the recovery of rubber solvent in the manufacture of vulcanized rubber articles by the dipping method, first passing the dipping form coated with rubber solution through a bath which is mutually soluble with the rubber solvent but not with the rubber; secondly agitating the bath with a quantity of mineral oil and permitting the resulting mixture to settle and separate, the rubber solvent being taken up by the mineral oil.

3. In the manufacture of vulcanized rubber articles by the dipping method, the recovery of benzol and carbon tetra-chlorid solvents by the following steps: first passing the dipping form coated with the rubber solution through a bath which is mutually soluble with the rubber solvent but not with the rubber; secondly agitating the bath with mineral oil, and permitting the resulting mixture to settle and separate, the solvent being taken up by the mineral oil.

4. In the manufacture of vulcanized rubber articles by the dipping method, the recovery of the rubber solvent by the following steps, first, passing the dipping form coated with the rubber solution through a bath which is mutually soluble with the rubber solvent, but not with the rubber, second, agitating the bath with oil and allowing them to separate again, whereby the solvent is removed from the bath by the oil, and third, separating the solvent from the oil.

Signed at Cleveland, Ohio, April 10, 1916.

JOHN D. MORRON.